US006995356B2

(12) United States Patent
Chong et al.

(10) Patent No.: US 6,995,356 B2
(45) Date of Patent: Feb. 7, 2006

(54) OPTICAL ENCODER DEVICE

(75) Inventors: Chee Keong Chong, Penang (MY); Yee Loong Chin, Perak (MY)

(73) Assignee: Agilent Technologies, Inc., Palo Alto, CA (US)

( * ) Notice: Subject to any disclaimer, the term of this patent is extended or adjusted under 35 U.S.C. 154(b) by 191 days.

(21) Appl. No.: 10/369,859

(22) Filed: Feb. 20, 2003

(65) Prior Publication Data

US 2003/0193015 A1    Oct. 16, 2003

(30) Foreign Application Priority Data

Apr. 11, 2002  (MY) ............................... PI20021344

(51) Int. Cl.
*G01D 5/34* (2006.01)
(52) U.S. Cl. .......................... 250/231.14; 250/227.28; 341/13
(58) Field of Classification Search ............ 250/231.13, 250/231.14, 231.18, 237 G, 227.11, 227.28; 341/13
See application file for complete search history.

(56) References Cited

U.S. PATENT DOCUMENTS

| 5,168,268 A | * | 12/1992 | Levy ........................... 345/165 |
| 5,329,121 A | * | 7/1994 | Leviton .................. 250/231.13 |
| 6,104,023 A | * | 8/2000 | Maeda ................... 250/231.13 |
| 6,278,107 B1 | | 8/2001 | Gaumet |
| 6,794,636 B1 | * | 9/2004 | Cardillo et al. ........ 250/231.13 |

FOREIGN PATENT DOCUMENTS

| DE | 4004728 A1 | 8/1990 |
| EP | 1111347 A1 | 12/1999 |
| EP | 1189035 A2 | 9/2001 |
| EP | 1312896 A1 | 10/2002 |
| JP | 590005217 | 1/1984 |
| JP | 590032813 | 2/1984 |
| JP | 600031016 | 2/1985 |
| JP | 610000712 | 1/1986 |
| JP | 630238428 | 10/1988 |

* cited by examiner

*Primary Examiner*—David Porta
*Assistant Examiner*—Seung C. Sohn (57) ABSTRACT

An optical encoder device (100) comprises: an optical emitter (103) for emitting light, the optical emitter (103) having a light emission direction (E); an optical detector (104) for detecting light emitted by the optical emitter (103), the optical detector (104) having a light detection direction (D) which is different from the light emission direction (E); an optical element (109) for controlling an optical path (108) between the optical emitter (103) and the optical detector (104) such that light emitted by the optical emitter (103) can be detected by the optical detector (104); and a free area (113) in the optical encoder device (100) for accommodating a moveable optical encoding unit (112) comprising a plurality of alternating transparent and opaque encoding elements such that the plurality of alternating transparent and opaque encoding elements of the optical encoding unit (112) is able to affect the optical path (108).

33 Claims, 5 Drawing Sheets

OPTICAL ENCODER DEVICE

BACKGROUND AND RELATED ART

The present invention relates to an optical encoder device, and more specifically to the detailed design of an optical encoder device.

An encoder is a device that provides feedback to a closed loop system. The encoder enables a signal interpretation such as to obtain information on a position, velocity, acceleration and/or the like when the encoder works in conjunction with a codewheel or a codestrip. Codewheels are generally used for detecting the rotational motion, for example of a paper feeder drum in a printer or a copying machine, while codestrips are used for detecting the linear motion, for example of a print head of a printer.

Usually, the motion of the codewheel or the codestrip is detected optically by means of an optical emitter and an optical detector. Therefore, the encoder is usually an optical encoder. The optical emitter emits light in a light emission direction towards the codewheel/codestrip. The codewheel/codestrip comprises a regular pattern of slots and bars. According to the position of the slots and bars relative to the light emission direction, the codewheel/codestrip alternately permits and prevents light passing therethrough. The optical detector is positioned behind the codewheel/codestrip, when seen in the direction of the light emission from the optical emitter, and detects a light signal based on the light emitted by the optical emitter and transmitted through the codewheel/codestrip. The detected light signal is either quadruple or sinusoidal and the frequency of said light signal yields an unambiguous information on the motion of the codewheel/codestrip.

Figures 2A, 2B:
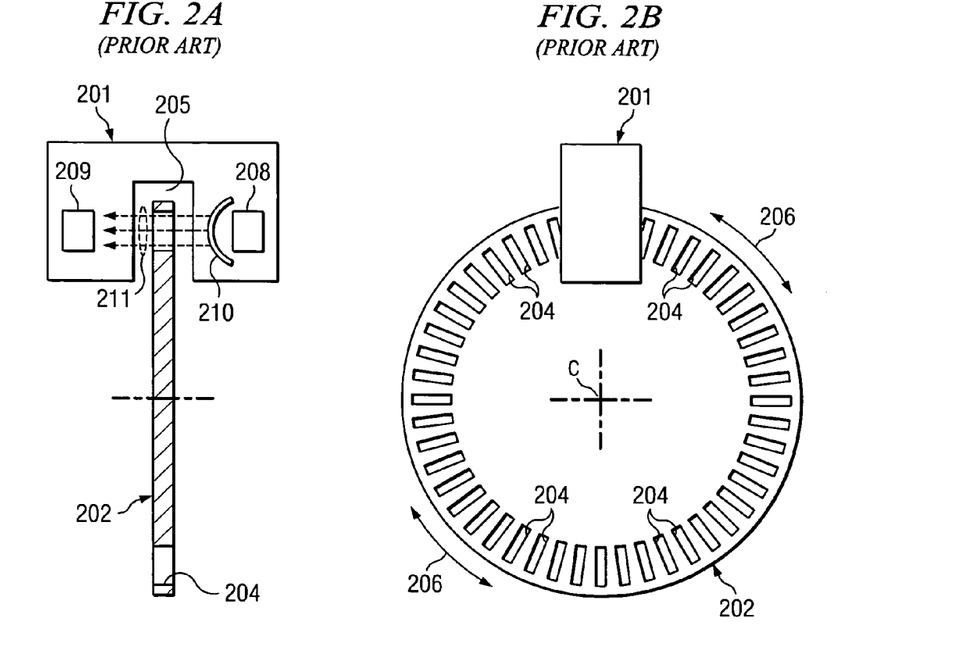
FIGS. 2A and 2C show cross-sections through a schematic optical encoder device according to the prior art.
FIGS. 2B and 2D show top views of a schematic optical encoder device according to the prior art.
Figure 2C:
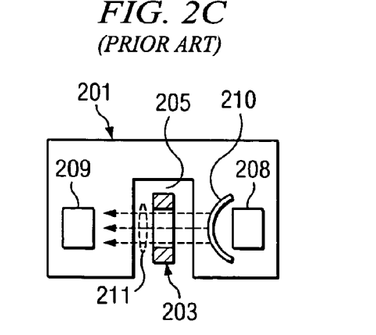
Figure 2D:
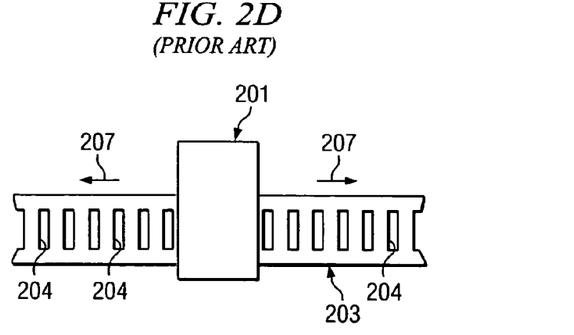

Due to the special arrangement of the optical emitter and the optical detector of such an optical encoder, the optical encoder housing for accommodating the optical encoder is generally C-shaped. The optical encoder together with the C-shaped optical encoder housing form a C-shaped optical encoder device. The codewheel/codestrip is passed through the free area (the recess) of the C-shaped optical encoder device and moves such that the optical encoder can detect the slots and bars formed in the codewheel/codestrip. FIG. 2A and FIG. 2C show cross-sections through and FIG. 2B and FIG. 2D show top views of such a C-shaped optical encoder device 201 together with a codewheel 202 and a codestrip 203, respectively. The codewheel 202 and the codestrip 203 are provided with a regular pattern of slots 204 (and bars between the slots 204) which are arranged such that a motion of the codewheel 202 or the codestrip 203, respectively, is unambiguously detectable. Therefore, the codewheel 202 or the codestrip 203, respectively, is passed through the free area 205 of the generally C-shaped optical encoder device 201 which takes up the codewheel 202 or the codestrip 203, respectively. If the codewheel 202 is rotated around the center axis C in a direction indicated by the arrows 206, or if the codestrip 203 is linearly moved in a direction indicated by the arrows 207, respectively, the slots 204 (and the bars between the slots 204) cause an alternating light signal in the optical detector of the optical encoder which results in an unambiguous information on the motion of the codewheel 202 or the codestrip 203, respectively.

Generally, the C-shaped optical encoder device 201 is mounted on a printed circuit board (PCB) which is positioned inside the appliance, e.g. a printer or a copying machine, and which is used for an electrical coupling of the optical encoder to the control unit of the appliance. The C-shaped optical encoder device 201 itself comprises as main components an optical emitter 208 and an optical detector 209. The optical emitter 208 may be a light emitting diode, whereas the optical detector 209 is usually an array of photodiodes. The optical emitter 208 and the optical detector 209 are arranged inside the C-shaped optical encoder device 201 such that a straight optical path 211 results for light, which is emitted by the optical emitter 208 and detected by the optical detector 209. Light, which is emitted by the optical emitter 208 and travels along the optical path 211, is first collimated into parallel light by means of an optical lens 210, which is positioned next to the optical emitter 208, then transmitted through the free area 205 and partly through the codewheel 202 or the codestrip 203, respectively, and finally detected by the optical detector 209, which is placed opposite to the optical emitter 208. Due to the opposite arrangement of the optical emitter 209 and the optical detector 209 relative to the codewheel 202 or the codestrip 203, respectively, a special optical through-beam solution for the codewheel 202 or the codestrip 203, respectively, is provided. This optical through-beam solution provides a good performance for detecting the motion of the codewheel 202 or the codestrip 203, respectively.

However, the available optical encoder devices according to the prior art are manufactured with a large number of piece parts in large-scale processes and with extensive production costs.

Figure 3A:
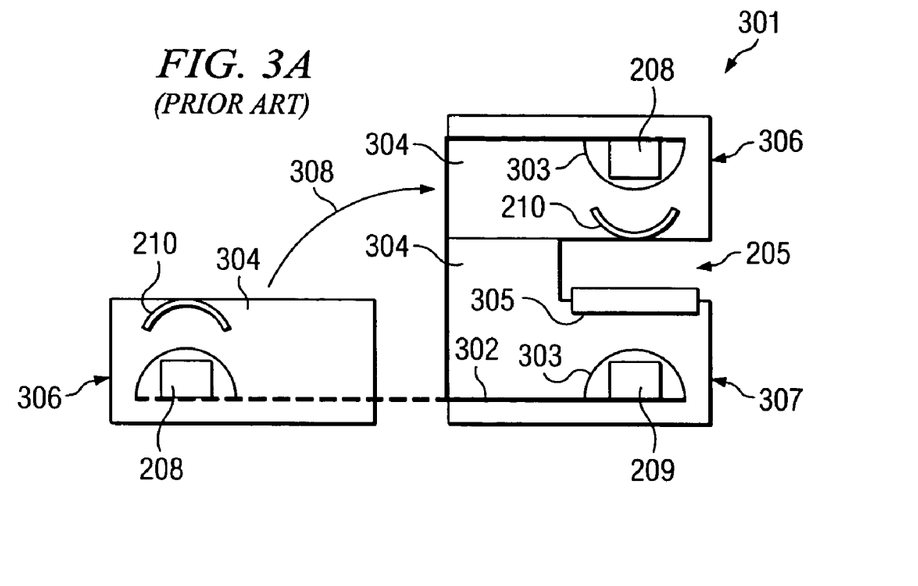
FIG. 3A shows a cross-section through a first type of optical encoder device according to the prior art.

FIG. 3A shows a cross-section through a first type of optical encoder device 301 according to the prior art. The first optical encoder device 301 comprises an optical emitter 208 and an optical detector 209 which are arranged on a lead frame 302. The lead frame 302 is buried in a housing material 304 and comprises an electrical circuitry (not shown), which is used for electrically contacting the optical emitter 208 and the optical detector 209. Generally, the optical emitter 208 and the optical detector 209 are each covered with a capsule 303. During manufacturing the optical encoder device 301 the optical emitter 208 and the optical detector 209 are first placed on a single common flat lead frame 302 and then covered with the capsules 303. Afterwards, the flat common lead frame 302 with the optical emitter 208, the optical detector 209 and the capsules 303 is covered with an optical transparent housing material 304. Further, an optical lens 210 is provided directly above the optical emitter 208 and partly inside the housing material 304. Additionally, a window 305 is provided directly above the optical detector 209 and partly inside the housing material 304.

The optical lens 210 and the window 305 are provided to enable a satisfying optical transmission for light through the surface of the housing material 304 at predetermined places. Further, the optical lens 210 is provided to collimate light, which is emitted by the optical emitter 208, into parallel light beams. After manufacturing the optical lens 210 and the window 305 the intermediate device is divided in an optical emitter element 306 and an optical detector element 307. Then, the optical emitter element 306 is placed above the optical detector element 307, as indicated with arrow 308 in FIG. 3A, such that the optical emitter 208 together with the optical lens 210 is placed opposite to the optical detector 209 and the window 305 for forming a C-shaped optical encoder. Finally, the optical emitter element 306 is fixed to the optical detector element 307 with a mounting bracket (not shown). Therefore, light emitted by the optical emitter 208 is collimated by the optical lens 210, transmitted through the free area 205 between the optical emitter 208 and the optical detector 209 and through the window 305 and detected by the optical detector 209. Thus, the first type of optical encoder device 301 represents a folded device comprising the optical emitter element 306 and the optical detector element 307.

Figure 3B:
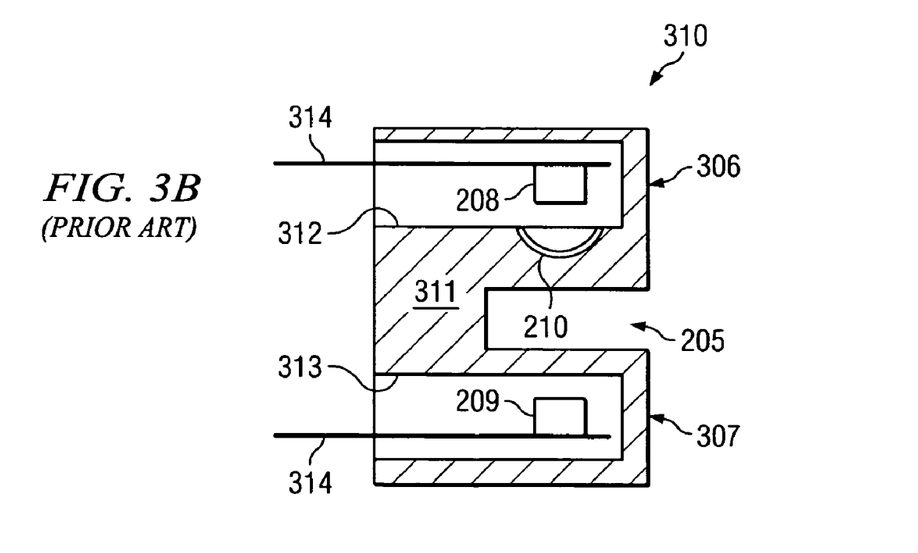
FIG. 3B shows a cross-section through a second type of optical encoder device according to the prior art.

FIG. 3B shows a cross-section through a second type of optical encoder device 310 according to the prior art. In contrast to the first type of optical encoder device 301 described above, the second type of optical encoder device 310 is manufactured differently and comprises a C-shaped encoder housing 311 with a free area (recess) 205. The encoder housing 311 comprises optical transparent material and an optical lens 210. An optical emitter element 312 and an optical detector element 313 are separately manufactured and subsequently inserted into respective recesses formed in the encoder housing 311 such that the optical emitter 208 is placed next to the optical lens 210. The optical emitter element 312 and the optical detector element 313 each comprise a lead frame 314, on which the optical emitter 208 and the optical detector 209, respectively, are mounted as well as a housing. The lead frames 314 comprise an electrical circuitry (not shown) for electrically contacting the optical emitter 208 and the optical detector 209, respectively. Therefore, this second type of optical encoder device 310 represents a composed device with individually manufactured elements.

However, the first type of optical encoder device 301 and the second type of optical encoder device 310 according to the prior art have some disadvantages. Among others, they need a large number of piece parts and involve large-scale processing methods and, thereby, cause high production costs.

Therefore, it is an object of the present invention to overcome some or all disadvantages of the prior art.

SUMMARY OF INVENTION

An optical encoder device according to a main aspect of the present invention comprises: an optical emitter for emitting light, the optical emitter having a light emission direction; an optical detector for detecting light emitted by the optical emitter, the optical detector having a light detection direction which is different from the light emission direction; an optical element for controlling an optical path between the optical emitter and the optical detector such that light emitted by the optical emitter can be detected by the optical detector; and a free area in the optical encoder device for accommodating a moveable optical encoding unit comprising a plurality of alternating transparent and opaque encoding elements such that the plurality of alternating transparent and opaque encoding elements of the optical encoding unit is able to affect the optical path.

Light in the context of the present invention can be electromagnetic radiation of any wavelength, particularly visible light, ultraviolet radiation and/or infrared radiation, for instance.

One advantage of the present invention over the prior art is that the optical encoder device according to the present invention enables both an optical through-beam solution for the optical encoding element such as a codewheel/codestrip and a single unfolded common substrate comprising both the optical emitter and the optical detector. The optical through-beam solution for the optical encoding element has the advantage of a high performance and the single unfolded common substrate has the advantage that the optical encoder device according to the present invention can be manufactured with simple manufacturing operations and with few process steps. Another advantage of the present invention is that the number of piece parts, which have to be aligned and fixed to each other, is reduced with respect to the prior art. A further advantage of the present invention is that by means of the simplified manufacturing operations, the reduced process steps and the reduced number of piece parts the product costs are reduced.

The above and other objects, features and advantages of the present invention will become apparent from the following description and the appended claims, taken in conjunction with the accompanying drawings in which like parts or elements are denoted by like reference numbers.

DETAILED DESCRIPTION OF THE PREFERRED EMBODIMENTS

Preferred embodiments of the present invention will now be described with reference to the accompanying drawings in which like parts or elements are denoted by like reference numbers.

Figure 1:
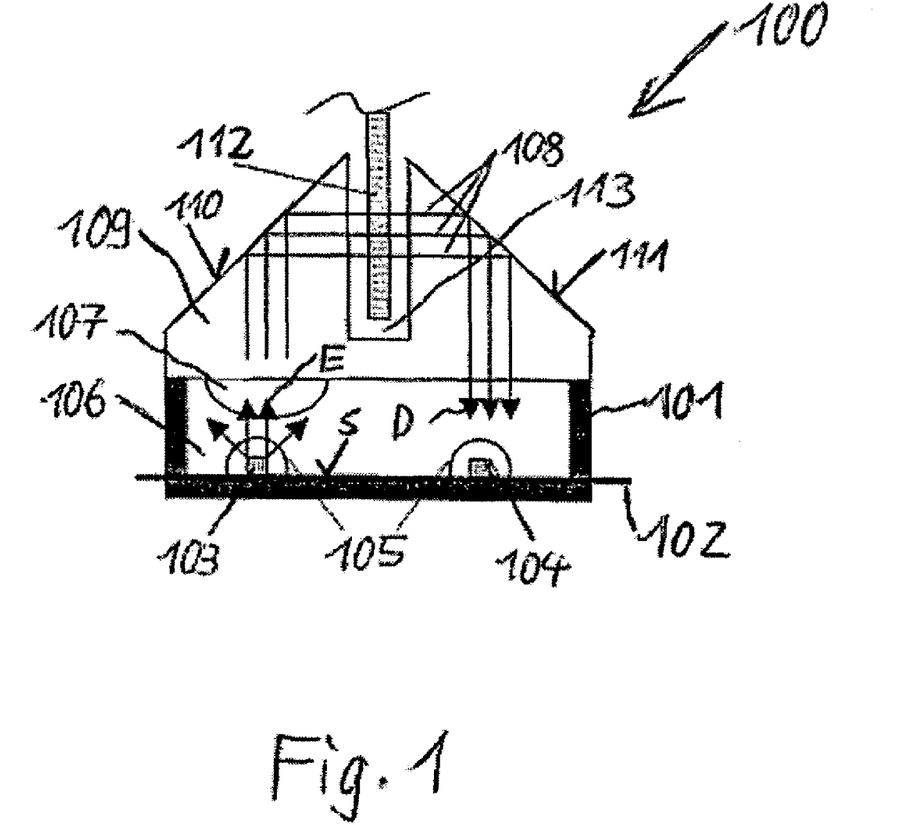
FIG. 1 shows a cross-section through an optical encoder device according to a first preferred embodiment of the present invention.

FIG. 1 shows a cross-section through an optical encoder device 100 according to a first preferred embodiment of the present invention.

The optical encoder device 100 is substantially C-shaped and comprises a substrate 101 having an electrical circuitry 102, an optical emitter 103, an optical detector 104 and an optical element 109. The optical emitter 103 and the optical detector 104 are electrically connected to the electrical circuitry 102, are mounted adjacent to each other on a flat inward surface S of the substrate 101 and each of them is covered with a capsule 105. In general, according to the invention, the substrate 101 can be e.g. a lead frame, an insert-molded lead frame, a printed circuit board (PCB), a ceramics substrate or a microinterconneting device (MID). In this embodiment of the invention, the optical encoder device 100 is described in connection with an insert-molded lead frame as the substrate 101. The optical emitter 103 has a light emission direction which is indicated with reference sign E. The optical detector 104 has a light detection direction which is indicated with reference sign D and which is different from the light emission direction E of the light emitter 103. According to the first preferred embodiment of the present invention, the optical emitter 103 and the optical detector 104 are arranged such that the light emission direction E and the light detection direction D are at least substantially antiparallel. The lead frame 101 encloses an air gap 106 and comprises an optical lens 107 above the optical emitter 103 substantially in light emission direction E. The optical lens 107 can be attached to the lead frame 101. Light, which is emitted by the optical emitter 103, is collimated by the optical lens 107 into parallel light beams and enters the optical element 109 in light emission direction E above the light emitter 103 as well as above the light detector 104. The light, which is emitted by the optical emitter 103 and enters the optical element 109, travels along an optical path 108 inside the optical element 109 towards the optical detector 104.

According to the present invention, the optical element 109 is arranged such that it allows internal reflection inside the optical element 109. Therefore, the optical element 109 comprises optical transparent material as well as a flat first surface 110 and a flat second surface 111 facing each other. The first surface 110 and the second surface 111 are arranged in the optical element 109 opposite to the light emitter 103 and the light detector 104, and interface the adjacent medium next to the optical element 109.

If light encounters from a high-density medium an interface between the high-density medium and a low-density medium, the light is generally refracted away from the normal plane of the interface (Snell's Law). If the angle enclosed between the direction of the encountering light and the normal plane of the interface is larger than a critical value, the light is totally reflected at the interface and does not leave the high-density medium. This behavior is known as total internal reflection. The first surface 110 and the second surface 111 each enclose a predetermined angle with the light emission direction E such that the predetermined angles are larger than the critical angle of the interfaces between the optical element 109 and the adjacent medium. According to the present invention, the optical element 109 comprises an epoxy resin, whereas the adjacent medium is air. Therefore, the critical angle for the first surface 110 and the second surface 111 is around 41°. Thus, the first surface 110 and the second surface 111 control the optical path 108 between the optical emitter 103 and the optical detector 104.

To ensure a complete reflection of the encountering light at the first surface 110 and the second surface 111, the optical element 109 may be coated with reflective material on the first surface 110 and/or the second surface 111. Such a coating is useful to make the optical element 109 less susceptible to manufacturing inaccuracies of the optical encoder device 100 or fluctuations of the light emission direction E during the operation of the light emitter 103 and, therefore, prevents an undesired light loss at the first surface 110 and the second surface 111, respectively.

According to the first preferred embodiment of the present invention, the first surface 110 encloses a first angle of at least substantially −45° with respect to the light emission direction E of the light emitter 103, whereas the second surface 111 encloses a second angle of at least substantially +45° with respect to the light emission direction E of the light emitter 103. The light, which enters the optical element 109 above the optical emitter 103 and travels along the optical path 108, encounters the first surface 110, is totally reflected at the first surface 110 and directed towards the second surface 111. After travelling to the second surface 111, this light is totally reflected at the second surface 111 such that it is now directed to the optical detector 104. Therefore, due to the first surface 110 and the second surface 111, the optical path 108 is substantially U-shaped.

According to the present invention, the optical emitter 103 is a light emitting diode and the optical detector 104 comprises an array of photodiodes. The optical emitter 103 may emit light as a point source, as a slit source, as a plane source or as a volumetric source. The optical encoder device 100 further comprises a free area 113 for accommodating a moveable optical encoding unit 112 comprising a plurality of alternating transparent and opaque encoding elements. According to the present invention, the optical encoding unit 112 is a codewheel/codestrip and comprises a regular pattern of slots and bars (not shown). The optical encoding unit 112 is arranged such that the regular pattern is able to affect the optical path 108. A signal processor (not shown) is electrically connected to the optical detector 104 for processing the electrical signals generated by the optical detector 104 on the basis of a variation of detected light, which is caused by a movement of the optical encoding unit 112 inside the free area 113. According to the first preferred embodiment of the present invention, the free area 113 is arranged inside the optical element 109 between the first surface 110 and the second surface 111.

The optical element 109 is integrally formed and, therefore, the manufacturing of the optical encoder device 100 involves a less number of product parts compared to the prior art.

Figure 4:
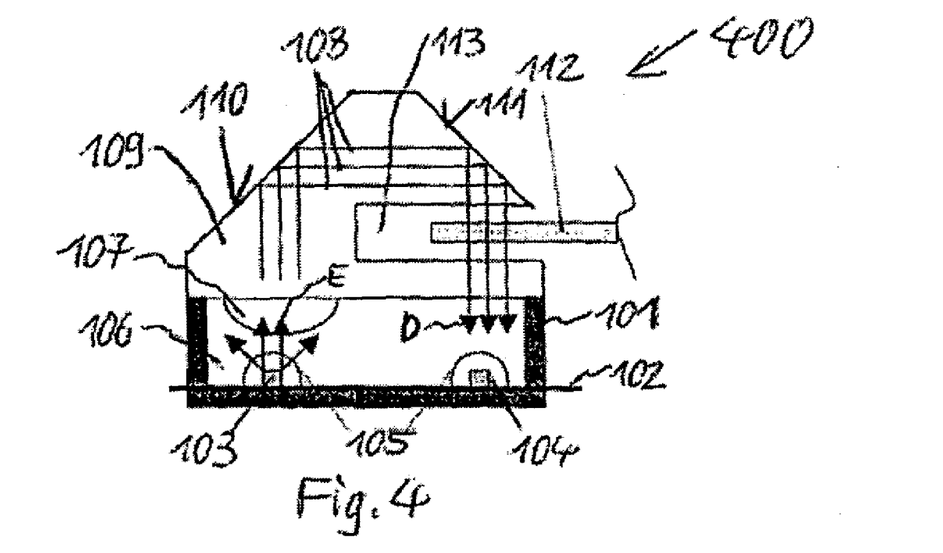
FIG. 4 shows a cross-section through an optical encoder device according to a second preferred embodiment of the present invention.

FIG. 4 shows a cross-section through an optical encoder device 400 according to a second preferred embodiment of the present invention. Parts already known from FIG. 1 will not be described again.

The only difference between the optical encoder device 400 according to the second preferred embodiment of the present invention and the optical encoder device 100 according to the first preferred embodiment of the present invention is that the free area 113 is arranged inside the optical element 109 between the second surface 111 and the optical detector 104. The fact that the free area 113 is positioned closer to the optical detector 104 has the advantages that optical diffractions caused by the optical encoding unit 112 are reduced, since the residual optical path 108 between the optical encoding unit 112 and the optical detector 104 is short, and that the response time to a movement of the optical encoding unit 112 is reduced.

Figure 5:
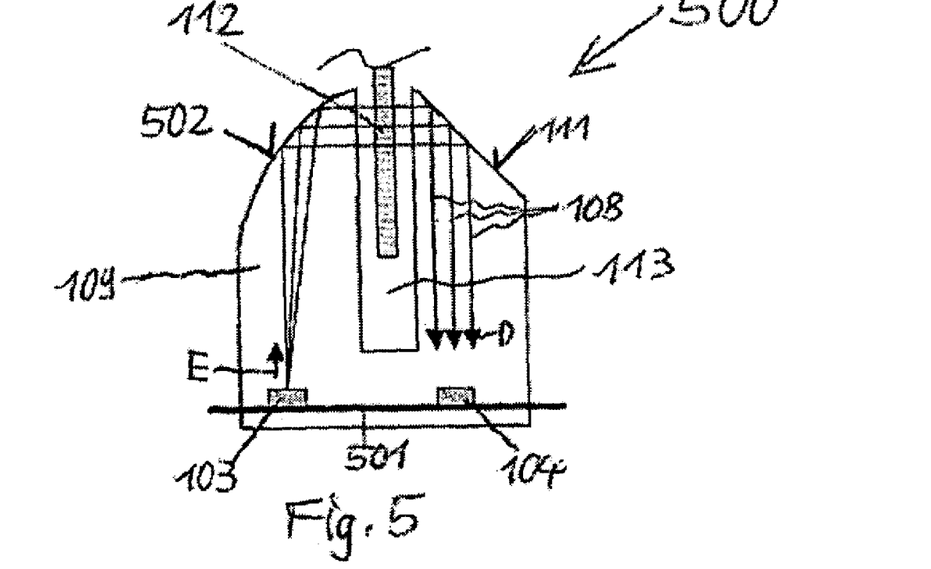
FIG. 5 shows a cross-section through an optical encoder device according to a third preferred embodiment of the present invention.

FIG. 5 shows a cross-section through an optical encoder device 500 according to a third preferred embodiment of the present invention. Parts already known from FIG. 1 or FIG. 4 will not be described again.

In contrast to the optical encoder devices 100 and 400 according to the first and second preferred embodiments of the present invention, the optical encoder device 500 according to the third preferred embodiment of the present invention comprises a substrate 501, which is buried in the optical element 109 opposite of a non-flat first surface 502 and the flat second surface 111. As in the first and second preferred embodiments of the invention, the substrate 501 can be e.g. a lead frame, an insert-molded lead frame, a printed circuit board (PCB), a ceramics substrate or a microinterconneting device (MID). The present embodiment will be described in conjunction with an insert-molded lead frame as substrate 501. The insert-molded lead frame 501 forms the optical bottom surface of the optical element 109. Pre-attached to the lead frame 501 are the optical emitter 103 and the optical detector 104. The optical encoder device 500 does not comprise an optical lens, because the first surface 502 of the optical element 109 has a three-dimensional parabolic shape. Therefore, the first surface 502 acts as a total reflecting mirror as well as a collimator for light encountering in light emission direction E from the light emitter 103. Thus, the light, which is totally reflected from the first surface 502, forms a parallel light beam before it encounters the second surface 111. As already mentioned above, the first surface 502 and/or the second surface 111 may be coated with reflective material to make the optical element 109 less susceptible to manufacturing inaccuracies of the optical encoder device 500 or fluctuations of the light emission direction E during the operation of the light emitter 103 and, thereby to prevent an undesired light loss at the first surface 502 or the second surface 111, respectively.

According to the third preferred embodiment of the present invention, the second surface 111 encloses an angle of at least substantially +45° with respect to the light emission direction E of the light emitter 103. The light, which enters the optical element 109 above the optical emitter 103 and travels along the optical path 108, encounters the first surface 502, is totally reflected and collimated at the first surface 502 and directed towards the second surface 111. After traveling to the second surface 111, this light is totally reflected at the second surface 111 such that it is now directed to the optical detector 104. Therefore, due to the first surface 502 and the second surface 111, the optical path 108 is substantially U-shaped. According to the third preferred embodiment of the present invention and similar to the first preferred embodiment of the present invention, the free area 113 is arranged inside the optical element 109 between the first surface 502 and the second surface 111.

The use of a three-dimensional parabolic shaped first surface 502 instead of a collimating optical lens together with a flat first surface has the advantage that the parallelism of the light beam traveling along the residual optical path 108 is increased and, therefore, the performance of the optical encoder device 500 is enhanced.

Figure 6:
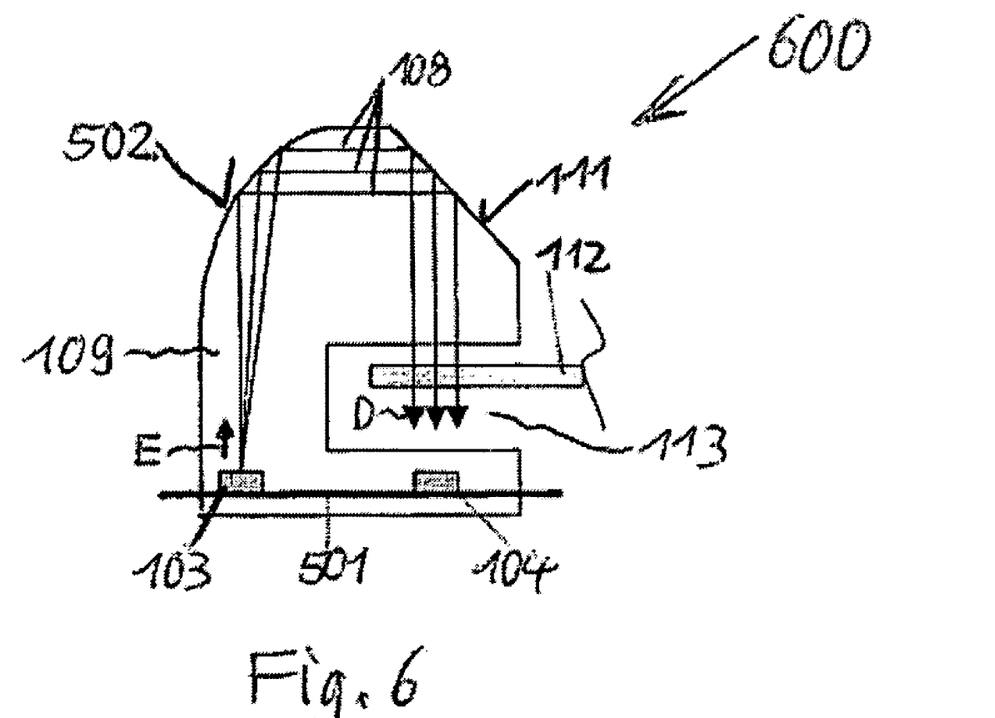
FIG. 6 shows a cross-section through an optical encoder device according to a fourth preferred embodiment of the present invention.

FIG. 6 shows a cross-section through an optical encoder device 600 according to a fourth preferred embodiment of the present invention. Parts already known from FIG. 1, FIG. 4 or FIG. 5 will not be described again.

The only difference between the optical encoder device 600 according to the fourth preferred embodiment of the present invention and the optical encoder device 500 according to the third preferred embodiment of the present invention is that the free area 113 is arranged inside the optical element 109 between the second surface 111 and the optical detector 104. The fact that the free area 113 is positioned closer to the optical detector 104 has the advantages that optical diffractions caused by the optical encoding unit 112 are reduced, since the residual optical path 108 between the optical encoding unit 112 and the optical detector 104 is short, and that the response time to a movement of the optical encoding unit 112 is reduced.

In the following table 1, the number and kind of piece parts needed for manufacturing an optical encoder device is compared for the optical encoder devices 500 and 600 according to the third and fourth preferred embodiments of the present invention, for the optical encoder devices 100 and 400 according to the first and second preferred embodiments of the present invention, as well as for the first and second optical encoder devices 301 and 310 according to the prior art.

TABLE 1

| No. | optical encoder devices 500 and 600 | optical encoder devices 100 and 400 | first type of optical encoder device 301 (prior art) | second type of optical encoder device 310 (prior art) |
|---|---|---|---|---|
| 1 | Substrate (insert-molded lead frame) 501 with electrical circuitry 102 | Substrate (lead frame) 101 with electrical circuitry 102 | Substrate (lead frame) 302 with electrical circuitry 102 | Substrate (lead frame) 314 for optical emitter 208 with electrical circuitry (not shown) |
| 2 | optical emitter 103 | optical emitter 103 | optical emitter 208 | optical emitter 208 |
| 3 | optical detector 104 | optical detector 104 | optical detector 209 | housing material for optical emitter element 312 |
| 4 | optical element 109 | capsule 105 for optical emitter 103 | capsule 303 for optical emitter 208 | Substrate (lead frame) 314 for optical detector 209 with electrical circuitry (not shown) |
| 5 | Wire | capsule 105 for optical detector 104 | capsule 303 for optical detector 209 | optical detector 209 |
| 6 | Die attach (DA) | optical lens 107 | housing material 304 | housing material for optical detector element 313 |
| 8 | Epoxy | optical element 109 | optical lens 210 | encoder housing 311 |
| 9 | | Wire | window 305 | optical lens 210 |
| 9 | | Epoxy | mounting bracket (not shown) | Wire |
| 10 | | | Wire | Epoxy |
| 11 | | | Epoxy | |

From table 1 it becomes clear that the present invention, especially each of the third and fourth preferred embodiments, reduces the number of needed piece parts for an optical encoder device. Therefore, an optical encoder device according to the present invention considerably reduces the manufacturing processes as well as the production costs.

What is claimed is:

1. An optical encoder device, comprising:
an optical emitter emitting light, the optical emitter having a light emission direction;
an optical detector detecting light emitted by the optical emitter, the optical detector having a light detection direction different from the light emission direction;
an optical element controlling an optical path between the optical emitter and the optical detector such that light emitted by the optical emitter is detected by the optical detector, the optical element comprising a first surface and a second surface facing each other, the first and second surfaces reflecting light emitted by the optical emitter and controlling the optical path between the optical emitter and the optical detector; and a free area arranged between the first and second surfaces accommodating a moveable optical encoding unit, the moveable optical encoding unit receiving collimated light and comprising a plurality of alternating transparent and opaque encoding elements wherein the plurality of alternating transparent and opaque encoding elements of the optical encoding unit affects the optical path.

2. The optical encoder device of claim 1 wherein the optical emitter and the optical detector are arranged so that the light emission direction and the light detection direction are at least substantially antiparallel.

3. The optical encoder device of claim 2 wherein the optical element is arranged so that the optical path is at least substantially U-shaped.

4. The optical encoder device of claim 3 wherein the optical element provides total internal reflection inside the optical element.

5. The optical encoder device of claim 1 wherein the first and second surfaces are flat, the first surface enclosing a first angle of at least substantially −45° with respect to the light emission direction, and the second surface enclosing a second angle of at least substantially +45° with respect to the light emission direction.

6. The optical encoder device of claim 5 further comprising a lens next to the optical emitter collimating light emitted by the optical emitter into parallel light beams before it travels along the optical path.

7. The optical encoder device of claim 1 wherein the first surface is parabolic and the second surface is flat, and the second surface enclosing an angle of at least substantially +450° with respect to the light emission direction, and the first surface is collimating light emitted by the optical emitter into parallel light beams.

8. The optical encoder device of claim 1 wherein the free area accommodating the optical encoding unit is accommodated in the optical element.

9. The optical encoder device of claim 1 wherein at least one of the first and second surfaces is coated with reflective material.

10. The optical encoder device of claim 1 wherein the first and second surfaces of the optical element reflect light emitted by the optical emitter.

11. The optical encoder device of claim 1 wherein the optical encoding unit is a codewheel or a codestrip.

12. The optical encoder device of claim 1 further comprising a signal processor processing signals generated by the optical detector on the basis of a movement of the optical encoding unit affecting the optical path in the free area.

13. The optical encoder device of claim 1 wherein at least one of the optical emitter and the optical detector is covered by a capsule.

14. The optical encoder device of claim 1 wherein the optical emitter and the optical detector are arranged on a substrate.

15. The optical encoder device of claim 1 wherein the optical emitter is a light emitting diode.

16. The optical encoder device of claim 1 wherein the optical detector comprises an array of photodiodes.

17. The optical encoder device of claim 1 wherein the optical element is integrally formed.

18. An optical encoder device, comprising:

an optical emitter emitting light, the optical emitter having a light emission direction;

an optical detector detecting light emitted by the optical emitter, the optical detector having a light detection direction different from the light emission direction;

an optical element controlling an optical path between the optical emitter and the optical detector such that light emitted by the optical emitter is detected by the optical detector, the optical element comprising a parabolic surface and a flat surface facing each other, the parabolic and flat surfaces reflecting light emitted by the optical emitter and controlling the optical path between the optical emitter and the optical detector, the flat surface enclosing an angle of at least substantially +45° with respect to the light emission direction, and the parabolic surface collimating light emitted by the optical emitter into parallel light beams; and a free area in the optical encoder device accommodating a moveable optical encoding unit, the moveable optical encoding unit receiving the parallel light beams and comprising a plurality of alternating transparent and opaque encoding elements wherein the plurality of alternating transparent and opaque encoding elements of the optical encoding unit affects the optical path.

19. The optical encoder device of claim 18 wherein the optical emitter and the optical detector are arranged so that the light emission direction and the light detection direction are at least substantially antiparallel.

20. The optical encoder device of claim 19 wherein the optical element is arranged so that the optical path is at least substantially U-shaped.

21. The optical encoder device of claim 20 wherein the optical element provides total internal reflection inside the optical element.

22. The optical encoder device of claim 18 wherein the free area accommodating the optical encoding unit is accommodated in the optical element.

23. The optical encoder device of claim 18 wherein the free area accommodating the optical encoding unit is arranged between the parabolic and flat surfaces.

24. The optical encoder device of claim 18 wherein the free area accommodating the optical encoding unit is arranged between the flat surface and the optical detector.

25. The optical encoder device of claim 18 wherein at least one of the parabolic and flat surfaces is coated with reflective material.

26. The optical encoder device of claim 18 wherein the parabolic and flat surfaces of the optical element reflect light emitted by the optical emitter.

27. The optical encoder device of claim 18 wherein the optical encoding unit is a codewheel or a codestrip.

28. The optical encoder device of claim 18 further comprising a signal processor processing signals generated by the optical detector on the basis of a movement of the optical encoding unit affecting the optical path in the free area.

29. The optical encoder device of claim 18 wherein at least one of the optical emitter and the optical detector is covered by a capsule.

30. The optical encoder device of claim 18 wherein the optical emitter and the optical detector are arranged on a substrate.

31. The optical encoder device of claim 18 wherein the optical emitter is a light emitting diode.

32. The optical encoder device of claim 18 wherein the optical detector comprises an array of photodiodes.

33. The optical encoder device of claim 18 wherein the optical element is integrally formed.

* * * * *